US012638366B2

(12) United States Patent
Harris et al.

(10) Patent No.: US 12,638,366 B2
(45) Date of Patent: May 26, 2026

(54) SAMPLE PROBE MOUNTED CONDENSERS

(71) Applicant: INSIGHT ANALYTICAL SOLUTIONS INC, Calgary (CA)

(72) Inventors: Philip C. Harris, Calgary (CA); Kevin Harris, Calgary (CA)

(73) Assignee: INSIGHT ANALYTICAL SOLUTIONS INC, Calgary (CA)

( * ) Notice: Subject to any disclaimer, the term of this patent is extended or adjusted under 35 U.S.C. 154(b) by 252 days.

(21) Appl. No.: 18/376,571

(22) Filed: Oct. 4, 2023

(65) Prior Publication Data

US 2024/0110851 A1 Apr. 4, 2024

Related U.S. Application Data

(60) Provisional application No. 63/412,976, filed on Oct. 4, 2022.

(51) Int. Cl.
| | |
|---|---|
| *G01N 1/22* | (2006.01) |
| *G01N 1/10* | (2006.01) |
| *G01N 1/40* | (2006.01) |

(52) U.S. Cl.
CPC ......... *G01N 1/2247* (2013.01); *G01N 1/4022* (2013.01); *G01N 2001/1075* (2013.01); *G01N 2001/2282* (2013.01); *G01N 2001/2285* (2013.01); *G01N 2001/4033* (2013.01)

(58) Field of Classification Search
CPC ............... G01N 1/2247; G01N 1/4022; G01N 2001/4033; G01N 2001/2285; G01N 2001/2282; G01N 2001/1075
See application file for complete search history.

(56) References Cited

U.S. PATENT DOCUMENTS

| | | | | | |
|---|---|---|---|---|---|
| 5,820,641 | A | * | 10/1998 | Gu | B01D 53/002 |
| | | | | | 55/DIG. 15 |
| 2009/0145581 | A1 | * | 6/2009 | Hoffman | F28F 3/14 |
| | | | | | 165/80.3 |
| 2020/0230527 | A1 | * | 7/2020 | Bayati | B01D 45/16 |

OTHER PUBLICATIONS https://www.universalanalyzers.com/products/gas-sample-coolers; Mar. 1, 2022.
https://www.amio2.com/accessories/demister-ii/; Mar. 1, 2022.

(Continued)

*Primary Examiner* — Paul M. West
(74) *Attorney, Agent, or Firm* — MBM Intellectual Property Law LLP

(57) ABSTRACT

An apparatus for cooling and condensing a fluid sample that includes an elongated insert member having a condensing section in an upper portion and a reflux section in a lower portion. The condensing section includes angled helical fins defining angled helical channels and the reflux section including saddle fins. Each of the saddle fins having an upper surface configured for self-draining of the fluid and a bottom surface. The insert member may be installed within an elongated first shell having an inside bore and a plurality of multi-start helical fins formed on an exterior surface of the first shell. The plurality of multi-start helical fins define a plurality of multi-start helical passages for a cooling medium to enter and flow in between the multi-start helical passages. The first shell may be installed within a second shell that provides active, liquid cooling. The insert member may alternatively be installed within a passive shell.

16 Claims, 9 Drawing Sheets

(56) References Cited

OTHER PUBLICATIONS https://new.abb.com/products/measurement-products/analytical/process-gas-chromatographs/drs2170-dynamic-reflux-sampler; Mar. 1, 2022.

https://www.yokogawa.com/us/solutions/products-platforms/process-analyzers/gas-analyzers/advanced-reflux-sampler/advanced-reflux-sampler/; Mar. 1, 2022.

https://www.galvanic.com/assets/images/content/ANG5218_AppNote-BrimstoneTailGas-19.pdf; Jun. 2015.

https://aai.solutions/tlg-837-tail-gas-air-demand-analyzer; Mar. 1, 2022.

https://www.yokogawa.com/ca/solutions/products-platforms/oprex/oprex-measurement/oprex-analyzers/gas-analyzers/advanced-reflux-sampler/advanced-reflux-sampler/; Mar. 1, 2022.

https://www.silcotek.com/hubfs/Literature%20Catalog/Data%20Sheets/DATA-DURSAN.pdf; Mar. 1, 2022.

https://www.universalanalyzers.com/products/gas-sample-probes/model-1221-distillation-sample-probe; Mar. 1, 2022.

* cited by examiner

1010

1090

1040

1050A

1050

1020

1060

1080

1070

1030

2090

3010

4010

4090

4010

4060

4050

3010

4090

SAMPLE PROBE MOUNTED CONDENSERS

CROSS-REFERENCE TO RELATED APPLICATIONS

This application claims the benefit and priority of U.S. Provisional Application 63/412,976, filed Oct. 4, 2022. The foregoing application is incorporated by reference herein in its entirety.

FIELD OF THE INVENTION

The present disclosure pertains to the field of sample processing and, in particular, to an apparatus for preventing or minimizing liquid condensation issues in gas analyzers.

BACKGROUND

Gas analyzers are used in various industries, however, there are major issues affecting the gas analyzer's accuracy and reliability. In particular, the majority of these issues are related to sample conditioning systems, with the most common issues involving liquid carry over or liquid condensation.

Existing methods and devices employed to prevent or minimize those issues typically include preventing liquid condensation by either heating the sample system and the analyzer above the maximum dew point temperature of the sample gas or reducing the sample gas pressure to lower the sample gas dew point below the temperature of the sample system and the analyzer. Other existing methods include intentionally condensing liquid at a particular location in the sample system in a controlled manner to reduce the sample gas dew point before it reaches the analyzer (e.g., via the use of sample coolers, chillers, or dryers, distillation probes, or reflux probes, etc.).

However, there are various drawbacks to the existing methods and devices. For example, in applications with high sample gas temperatures or low pressures, it is not always possible to prevent liquid condensation, especially when using gas analyzers that do not allow for operation at high temperature. Furthermore, some devices are very large, slow in response time, prohibitively expensive, or requiring significant utilities (e.g., electrical power) to operate. Some have limited pressure handling capability (e.g., not designed to operate under high pressures). Some are incompatible with sample gases that have very high dew point (e.g., over 70° C.) or are simply not designed to condense other liquids (e.g., other than water, sulfur, or sulfuric acid). Some are only available for a few physical environments, such as with flange mounting. Some may not function properly without additional high-maintenance devices such as thermoelectric or compressor coolers.

Therefore, there is a need for an apparatus that obviates or mitigates one or more limitations of the prior art, for example, being compatible with a wide range of sample stream compositions, temperatures, and pressures, being more compact in size, and incurring lower costs than existing reflux or distillation probes.

This background information is provided to reveal information believed by the applicant to be of possible relevance to the present disclosure. No admission is necessarily intended, nor should be construed, that any of the preceding information constitutes prior art against the present disclosure.

SUMMARY OF THE INVENTION

An object of the present disclosure is to provide an apparatus for cooling and condensing a fluid sample. The apparatus includes an elongated insert member having a condensing section in an upper portion, a reflux section in a lower portion, and a transition area between the condensing section and the reflux section. The condensing section includes a plurality of angled helical fins defining a plurality of angled helical channels. The reflux section includes a plurality of saddle fins where each of the saddle fins has an upper surface configured for self-draining of the fluid and a bottom surface. Each of the saddle fins is positioned to receive the sample from the plurality of angled helical fins. As well, the condensing section and the reflux section are operatively coupled along a central axis.

Embodiment further include an elongated first shell having an inside bore and a plurality of multi-start helical fins spirally formed on an exterior surface of the first shell. The plurality of multi-start helical fins define a plurality of multi-start helical passages for a cooling media to enter and flow in between the multi-start helical passages. The insert member is installed within the inside bore of the first shell so that the plurality of angled helical fins and the plurality of saddle fins make thermal contact with the inside bore to allow a heat transfer from the sample to the first shell.

Embodiments further include an second shell having a cooling inlet and a cooling outlet. The second shell is secured to an exterior of the first shell at an end with the other end of the second shell free to move axially and radially relative to the first shell. A space between the second shell and the first shell allows a cooling medium to enter and flow in a counter flow manner between the multi-start helical passages.

Further embodiments include a passive shell including a plurality of cooling fins on an exterior surface of the passive shell. The insert member is installed into an inside bore of the passive shell so that the plurality of angled helical fins and the plurality of saddle fins make thermal contact with the inside bore to allow a heat transfer from the sample to the passive shell, the inside bore of the passive shell and the insert member are operatively coupled along the central axis.

Embodiments have been described above in conjunctions with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
FIG. 1 illustrates an embodiment of an insert member, in accordance with the present disclosure.

Embodiments of the present disclosure may provide technical advantages or obviate or mitigate one or more limitations of the existing methods and devices. For example, an embodiment may be compatible with a wide range of sample stream compositions, temperatures, and pressures, it may be more compact in size, and it may incur lower costs than the existing reflux or distillation probes.

Embodiments include an apparatus for cooling and condensing a fluid sample. The apparatus includes an elongated insert member having a condensing section in an upper portion, a reflux section in a lower portion, and a transition area between the condensing section and the reflux section. The condensing section includes a plurality of angled helical fins defining a plurality of angled helical channels configured to cool and condense sample. The reflux section includes a plurality of saddle fins where each of the saddle fins has an upper surface configured for self-draining of the sample and a bottom surface which may have a variety of shapes. Each of the saddle fins may be positioned to receive the sample from the plurality of angled helical fins. Furthermore, the condensing section and the reflux section operatively couple along a common central axis.

Further embodiments may add on to the insert member by including an elongated first shell having an inside bore and a plurality of multi-start helical fins formed on an exterior surface of the first shell. The plurality of multi-start helical fins define a plurality of multi-start helical passages for a cooling media to enter and flow therebetween. The insert member may be installed within the inside bore of the first shell so that the plurality of angled helical fins and the plurality of saddle fins make thermal contact with the inside bore thereby allowing a heat transfer from the sample to the first shell.

Further embodiments may add on to the combination of the insert member and the first shell by adding a second shell. The second shell may have a cooling inlet and a cooling outlet for circulating a cooling media within the second shell. The second shell may be secured to an exterior of the first shell at an end of the second shell. The other end of the second shell may be free to move relative to the first shell in the axial and radial directions to accommodate axial expansion. A space between the second shell and the first shell may allow a cooling media to enter from the cooling inlet, flow in a counter-flow manner between the multi-start helical passages, and exit through the cooling outlet.

In embodiments, the cooling inlet may be in an upper portion of the second shell and the cooling outlet may be in a lower portion of the second shell to facilitate the flow of cooling media in a counter flow manner between the multi-start helical passages.

In embodiments, the second shell may be secured to the exterior of the first shell using a threaded connection.

The cooling media entering and flowing in between the multi-start helical passages may include a gas and/or a liquid.

Further embodiments may add on to the elongated insert member by including a passive shell including a plurality of cooling fins on an exterior surface of the passive shell. The insert member may be installed into an inside bore of the passive shell so that the plurality of angled helical fins and the plurality of saddle fins make thermal contact with the inside bore, thereby allowing a heat transfer from the sample to the passive shell. The inside bore of the passive shell and the insert member may be operatively coupled along a common central axis.

In embodiments, the plurality of cooling fins may be oriented diagonally.

Embodiments may further include a gas outlet on the top of the inside bore of the passive shell and a filter housing mounted on the gas outlet.

Embodiments may further include a pressure regulator or a pressure gauge at the bottom of the passive shell. The pressure regulator may receive passive heating from the sample which is routed from the top of the passive shell upon exiting back to the bottom of the passive shell via external tubing.

In embodiments, the insert member may be cylindrical in shape.

In embodiments, the insert member may further include a central bore formed from a top surface of the insert member and running along a central axis of the condensing section until an intersection with one or more radial bore formed in the transition area between the condensing section and the reflux section. The radial bore may form a passage between the central bore and the reflux section.

In embodiments, at least one of the plurality of saddle fins may have a convex upper surface.

In embodiments, the number, size, or shape of the plurality of angled helical channels may be pre-determined based on a rate of heat transfer from the insert member and a rate of liquid drainage from the insert member.

In embodiments, the plurality of saddle fins of the insert member may be arranged radially in rows and each row may be offset radially by about 45 degrees from the row below.

In embodiments, the reflux section in the insert member may be extendable in length. The length extension may be accomplished by adding one or more additional reflux sections of the same or different lengths. In particular, a second reflux section may be coupled to the bottom of the insert member to form a longer insert member with two reflux sections.

In embodiments, the material of the apparatus may include aluminium or stainless steel. Furthermore, the components of the apparatus may be formed from materials with the same or similar coefficients of thermal expansion.

Embodiments may include a method of cooling and condensing a fluid sample. The method may include receiving, by a sample probe, a fluid sample from a process flow. Then passing the fluid sample through any of the apparatus as described herein, and sending the fluid sample to an analyzer. The method may also include providing a cooling fluid or media to the apparatus as described herein.

Furthermore, embodiments can be certified for use in hazardous areas (e.g., potentially explosive gas atmospheres) or specifically designed for registration (e.g., as pressure fitting) or legal or regulatory compliance in various countries or regions (e.g., Canada, the United States, and the European Union), etc.

Embodiments of the present disclosure provide an apparatus for cooling and condensing a fluid sample, which includes an insert member with a plurality of angled helical fins and a plurality of saddle fins on its exterior, a first shell with a plurality of multi-start helical fins on its exterior, and a second shell. The insert member may be configured to "shrink fit" into the first shell. The assembly of the insert member and the first shell can be a product of any other suitable mechanism. Such an assembly, also referred to as "active condenser assembly" hereinafter, may be secured into an interior of the second shell on one end with a threaded connection. This may allow the opposite end of the active condenser assembly and the second shell to move freely in the axial and radial directions relative to each other. A sealing between the two parts can be accomplished with one or more O-rings or any other suitable sealing mechanism that can allow axial sliding movement (e.g., the active condenser assembly and the second shell can change length relative to each other, thus minimizing thermal stresses). In an embodiment, once installed, the insert member and the first shell can be considered a single unit. Alternatively in another embodiment, these two parts can be separated. The second shell is designed to form a compartment over the multi-start helical passages around the finned exterior surface of the first shell, through which a cooling media can enter, flow, and exit. Accordingly, the heat from cooling and condensing the sample flowing in the angled helical channels of the insert member can be passed or transferred to the cooling media flowing in the multi-start helical passages though forced convection. In relation to the present disclosure, embodiments or apparatus with forced convection may be interchangeably referred to as "active condensers" hereinafter.

Embodiments of the present disclosure further provide an apparatus for cooling and condensing a sample, which includes an insert member with a plurality of angled helical fins and a plurality of saddle fins on its exterior, and a passive shell with a plurality of cooling fins on its exterior. The insert member may be configured to "shrink fit" into the passive shell. Accordingly, the heat from cooling and condensing the sample can be released to the ambient environment through passive free convection. Therefore, embodiments or apparatus with free convection may be interchangeably referred to as "passive condensers" hereinafter.

Notably, the sample or the fluid sample can include a gas, a liquid, or a mixture of both. The term "sample" used herein may refer to a gas or a mixture of multiple types of gases, or a mixture of one of more gases and one or more liquids.

In some embodiments, fluid sample is a gas, dense phase, a mixture of gas and liquid, or a mixture of gas, liquid and solid. In some embodiments, the fluid sample is a gas sample having liquid(s) and/or solid(s) entrained therein.

An example of the term "dense phase" as used herein includes high pressure natural gas where the pressure is high enough to be supercritical, but would still a substance like water that can be condensed.

The present disclosure will now be described with reference to specific examples. It will be understood that the following examples are intended to describe embodiments of the disclosure and are not intended to limit the disclosure in any way.

FIG. 1 illustrates an embodiment of an insert member 1010, in accordance with the present disclosure. In embodiments, the insert member 1010 includes a condensing section 1020 in an upper portion, a reflux section 1030 in a lower portion, and a transition area 1080 between the condensing section 1020 and the reflux section 1030. In particular, the condensing section 1020 in the upper portion is designed to perform sample cooling, condensation, and condensate drainage. The reflux section 1030 in the lower portion is designed to not only provide sample cooling and condensation, but also create a contact between the sample condensate draining downward and the sample flowing upward to promote reflux or distillation action. Furthermore, the condensing section 1020 and the reflux section 1030 are operatively coupled along a central axis 1090. Notably, the insert member 1010 can be in a cylindrical shape with a circular cross profile about the central axis 1090 (as illustrated in FIG. 1) or any other suitable shape.

Again, referring to FIG. 1, the condensing section 1020 of the insert member 1010 includes a plurality of angled helical fins 1050 defining a plurality of angled helical channels 1050A between neighbouring angled helical fins 1050. Furthermore, the condensing section 1020 may also include an optional central bore 1040 formed from a top surface and running along the central axis 1090 of the condensing section 1020 until intersecting with an optional radial bore 1060 formed in the transition area 1080 between the condensing section 1020 and the reflux section 1030. The radial bore 1060 forms a passage between the central bore 1040 of the condensing section 1020 and the reflux section 1030 in order to facilitate drainage of liquid from the central bore 1040. Accordingly, the central bore 1040 is configured to reduce the axial heat transfer from the hotter bottom of the insert member 1010 to the cooler top of the insert member 1010, and also to provide an additional channel for the condensed sample liquids to drain. The bottom of the insert member 1010 may be hotter than the top of the insert member 1010 because the sample at the bottom of the insert member 1010 may have a higher temperature and content of fluid that can be condensed. In an embodiment, the top of the insert member 1010 can have a concave shape (or any other suitable shape) to direct the condensed sample liquids to the central bore 1040 if they fall back to the condenser from an additional, outlet port at the top of the reflux section 1030 (not shown).

Figure 4A:
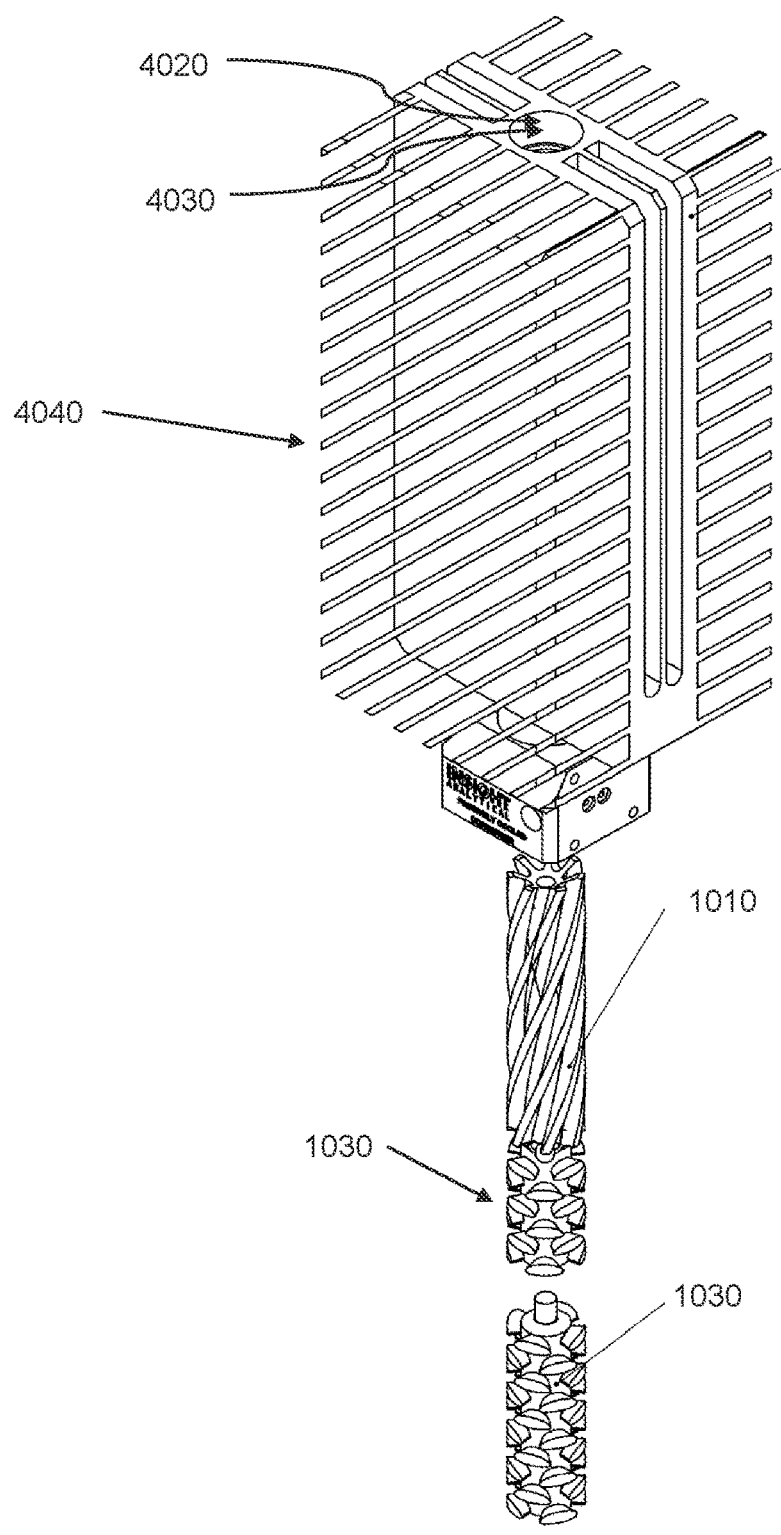
FIG. 4A illustrates an embodiment of a passive shell, in accordance with the present disclosure.

In particular, the reflux section 1030 is extendable in length, with additional reflux sections capable of being added as illustrated in FIG. 4A and discussed further hereinbelow. According to embodiments, the reflux section 1030 of the insert member 1010 includes a plurality of saddle fins 1070, with each of the saddle fins 1070 having a convex upper surface and a bottom surface that may be flat for ease of machining or 3D printing, or that may be in any other suitable geometric shape. In some embodiments, the convex upper surface of each saddle fin 1070 may be convex in the azimuthal-axial dimension, and in other embodiments, the convex surface may be additionally convex in other dimensions. The saddle fins 1070 with a convex upper surface can function as both cooling fins and a structured packing of distillation columns. Notably, the saddle fins 1070 are efficiently cooled due to their outside diameter being "shrunk fit" into the inside bore 2020 of the first shell 2010. Furthermore, the convex upper surface of the saddle fins 1070 can shed draining fluids (i.e., the sample condensates or condensed sample liquids) and direct the draining fluids to either side of each saddle fin 1070 so that the draining fluids can drop down onto the saddle fins 1070 below. In this approach, the sample is "washed" or "filtered" as it moves up through the spaces between the saddle fins 1070. Condensed liquids and entrained particulates from the sample may move down through the spaces between the saddle fins 1070. Specifically, each of the upper saddle fins 1070 is positioned to receive the sample from the plurality of angled helical fins 1050 and the radial bore 1060. In an embodiment, the number of the saddle fins 1070 in the insert member 1010 is four per row arranged in six rows, with each row offset by 45 degrees from the row below. In other embodiments, the number and layout of the saddle fins 1070 can be different. The number of saddle fins 1070 may further be the same as the number of angled helical fins 1050 or may be a different number.

To summarize, the condensing section 1020 has multiple angled helical fins 1050 with their outside diameter "shrunk fit" into the inside bore 2020 of the first shell 2010, thus forming helical channels (i.e., angled helical channels 1050A) with large surface area to effectively condense liquids out of the sample as it flows upwards through the condensing section 1020.

In operation, the number, size, and shape of the angled helical channels 1050A, formed within the angled helical fins 1050, can be pre-determined based on a number of parameters such as surface area and condensate drainage. For example, they can be selected to achieve close to the best compromise between high surface area (e.g., which can be achieved by having numerous small size channels) and good condensate drainage (e.g., which can be achieved by having large size channels), in order to obtain efficient cooling and condensation but also avoid liquid carryover out of the top of the condenser. The cross-section shape of the angled helical channels 1050A may vary (e.g., the shape can be round, triangular, square, etc.) In an embodiment, the width of the angled helical channels 1050A between the angled helical fins 1050 can be approximately between 6 mm and 10 mm.

In an embodiment (referring to FIG. 1), the insert member 1010 may be oriented vertically and include seven angled helical fins 1050. In an embodiment, the angle of the angled helical fins 1050 in the insert member 1010 is approximately between 60° and 80° from the horizontal level, perpendicular to the central axis of the insert member 1010. An angle or angles in this range (between 60° and 80° from the horizontal level) can provide a more efficient condensate drainage than either (close to) vertical ones (e.g., 90°) or the angles less than 60°. Furthermore, in comparison to a (close to) vertical fin structure, the angled helical fin 1050 structure is able to increase the thermal contact surface area due to an increased overall length and a reduced vertical velocity of the sample flow, thus improving Stokes' settling of the sample liquid droplets. In the example illustrated in FIG. 1, the angle of the angled helical fins 1050 is approximately 70° from horizontal level.

Figure 2A:
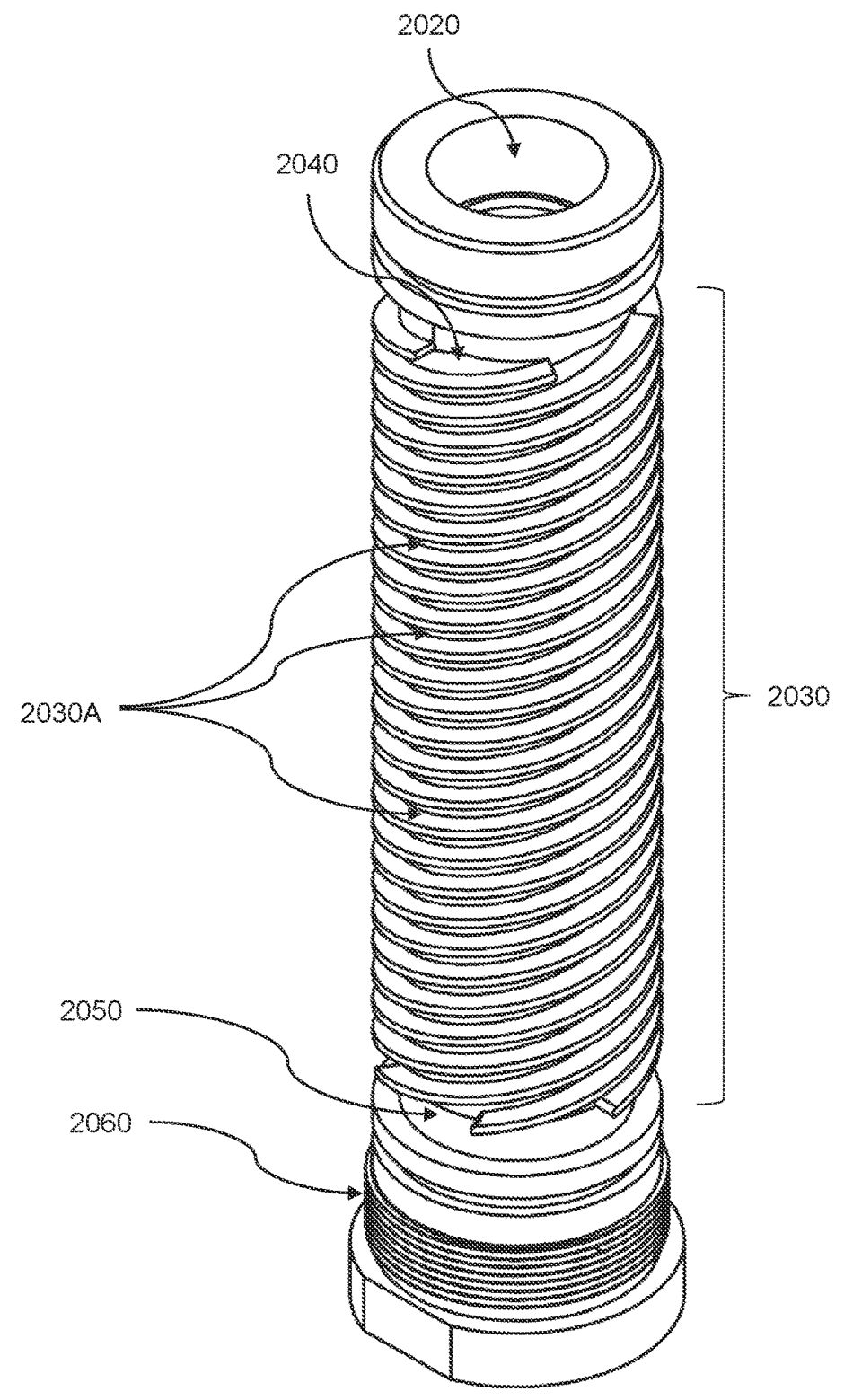
FIG. 2A illustrates an embodiment of a first shell, in accordance with the present disclosure.
Figure 2B:
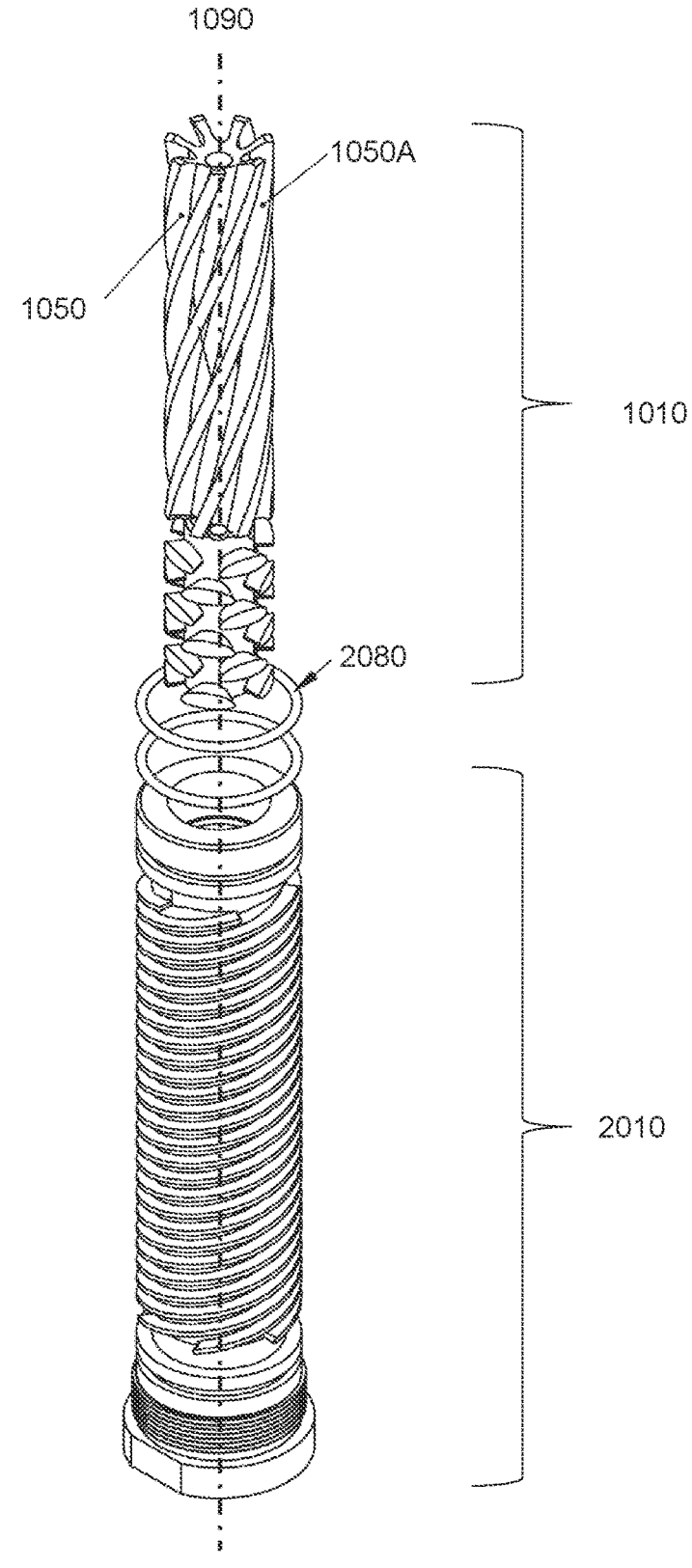
FIG. 2B illustrates an embodiment of an insert member and a first shell (in a pre-assembly or pre-installation status), in accordance with the present disclosure.

FIG. 2A illustrates an embodiment of a first shell 2010, in accordance with the present disclosure FIG. 2B illustrates an embodiment of how an insert member 1010 may be combined with a first shell 2010 (in a pre-assembly or pre-installation arrangement), in accordance with the present disclosure. The insert member 1010 may be configured to "shrink fit" into the first shell 2010, thus forming an active condenser assembly 2090. Notably, the amount of "shrink fit" must be carefully controlled to ensure that there is always a slight interference fit between the insert member

1010 and the first shell 2010. However, there cannot be too much interference (i.e., creating too much stress) between the insert member 1010 and the first shell 2010. The "shrink fit" may, for example, be achieved by heating the first shell 2010 and/or cooling the insert member 1010.

In embodiments, a condenser (either active or passive) can be formed of various materials, for example, aluminium or stainless steel. In an embodiment, the insert member 1010 and the first shell 2010 of an active condenser may be made from either the same material or materials with the same or similar coefficients of thermal expansion to avoid high thermal stresses between these two parts.

Notably, the first shell 2010 can be in a cylindrical shape (as illustrated in FIG. 2A and FIG. 2B) or in any other suitable shape, as long as it can match or fit properly with the insert member 1010 and the second shell 3010. The first shell 2010 has a sample inlet or connector at the bottom portion and a sample outlet or connector at the top portion (not shown).

According to embodiments, the first shell 2010 includes an inside bore 2020 and a plurality of multi-start helical fins 2030 spirally formed on an exterior surface of the first shell 2010. Those multi-start helical fins 2030 define a plurality of multi-start helical passages 2030A for a cooling media to enter, flow, and exit. The number of the multi-start helical fins 2030 can depend on the particular application. In an embodiment (as illustrated in FIG. 2A and FIG. 2B), there are six multi-start helical fins 2030 spirally formed on the exterior surface of the first shell 2010.

Accordingly, the insert member 1010 may be installed within the inside bore 2020 of the first shell 2010 so that outer surfaces of the angled helical fins 1050 and outer surfaces of the saddle fins 1070 of the insert member 1010 can make thermal contact with an inner surface of the inside bore 2020 of the first shell 2010. The heat of the sample is transferred to the first shell 2010 (e.g., via the walls of the inside bore 2020), thus cooling and condensing the sample. In particular, the multi-start helical fins 2030 can increase or maximize the surface area for a heat transfer while reducing or minimizing the pressure drop of cooling media or condensed sample flowing over and around the multi-start helical fins 2030. In addition, the sample inlet or connector and the sample outlet or connecter of the first shell 2010 may attach respectively at top and bottom ends of the inside bore 2020.

Figure 3A:
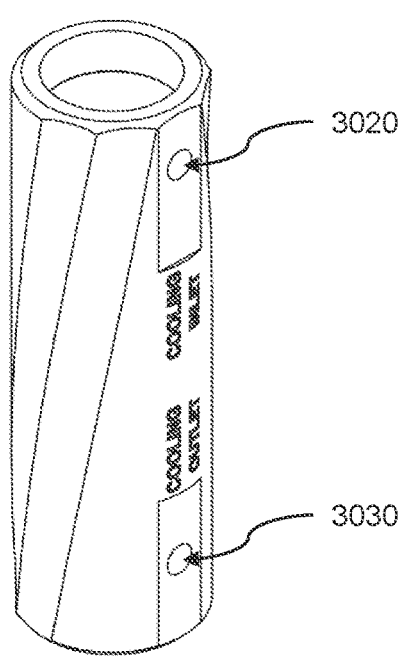
FIG. 3A illustrates an embodiment of a second shell, in accordance with the present disclosure.
Figure 3B:
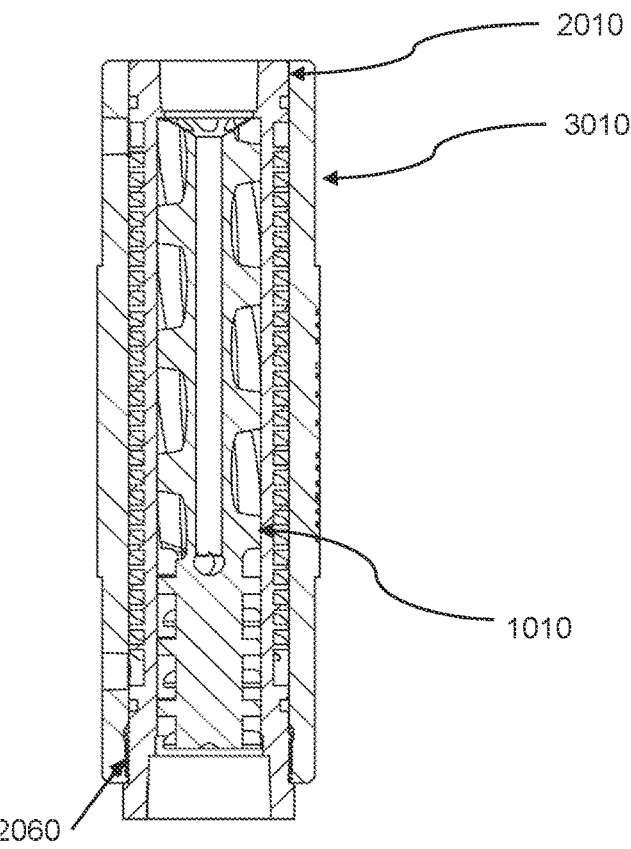
FIG. 3B illustrates a sectional view of an insert member, a first shell and a second shell (in a post-assembly or post-installation status), in accordance with the present disclosure.

FIG. 3A illustrates an embodiment of a second shell 3010, in accordance with the present disclosure. FIG. 3B illustrates a sectional view of an insert member 1010, a first shell 2010, and a second shell 3010 (in a post-assembly or post-installation configuration), in accordance with the present disclosure.

Referring to FIG. 3A, the second shell 3010 includes a cooling inlet 3020 in an upper portion and a cooling outlet 3030 in a lower portion. A cooling media (e.g., water) enters via the cooling inlet 3020, flows in the multi-start helical passages 2030A (or the space formed between the interior of the second shell 3010 and the exterior of the first shell 2010), and exits via the cooling outlet 3030.

Notably, as illustrated in FIG. 3B, the second shell 3010 is secured to an exterior surface of the first shell 2010 at one end (i.e., the bottom end when oriented vertically) with one or more threads 2060, with the other end (i.e., the top end) of the second shell 3010 free to move axially and radially relative to the first shell 2010. This is advantageous when the assembly heats up and the parts do not expand evenly. This arrangement with only one fixed attachment point can avoid thermal expansion stress issues (for example, the thermal expansion stresses can cause failure in a shell-and-tube type of heat exchangers when the sample to be cooled or being cooled and the cooling media have significant temperature differences). In some embodiments, the one or more threads 2060 may be located at the other end (i.e., the top end) instead of the one end (i.e., the bottom end). Furthermore, the sealing between the second shell 3010 and the first shell 2010 may be achieved with one or more O-rings 2080 (as illustrated in FIG. 2B) or via any other methods, which can allow sliding movement.

FIG. 4A illustrates an embodiment including a passive shell 4010, in accordance with the present disclosure. In embodiments, the passive shell 4010 includes a plurality of cooling fins 4040 on an exterior surface of the passive shell 4010. Notably, the cooling fins 4040 (e.g., machined or formed into the body of the passive shell 4010) can be oriented diagonally. An insert member 1010 is installed into an inside bore 4020 of the passive shell 4010 so that the angled helical fins 1050 and the saddle fins 1070 of the insert member 1010 can make thermal contact with the inside bore 4020 of the passive shell 4010. The insert member 1010 and the passive shell 4010 may be configured to be "shrink fit". The heat of the sample is transferred to the inside bore 4020, thus cooling and condensing the sample. According to embodiments, the passive shell 4010 may include a gas outlet 4030 on the top of the inside bore 4020 of the passive shell 4010 (with an optional filter housing mounted on the gas outlet 4030). Furthermore, the inside bore 4020 of the passive shell 4010 and the insert member 1010 are operatively coupled along a central axis.

In an embodiment, the angle of the cooling fins 4040 of the passive shell 4010 can range approximately between 40° and 55° from the radial plane of the inside bore 4020 of the passive shell 4010. Based on computational fluid dynamics (CFD) modelling and experimental testing, if the cooling fins 4040 were arranged (close to) vertically (i.e., 90° from the horizontal level), the sample exiting (e.g., from the gas outlet 4030) would have a higher temperature than if the cooling fins 4040 were arranged diagonally. For conventionally designed heat sinks (i.e., existing passive heat exchangers) with close to vertical cooling fins, the highest temperature is near the top of the heat sink because cold air flows up between the cooling fins at the bottom of the heat sink and is heated continuously (by the sample) until it flows out of the top of the heat sink. The diagonal orientation of the cooling fins 4040 can deliver cooler air to the cooling fins near the top of the heat sink and in this way the coolest part of the condenser body is at the top, not at the bottom like in a conventional vertical fin heat sink.

As illustrated by FIG. 4A, given a long enough inside bore 4020 or 2020, a second or additional reflux section 1030 can be coupled to the bottom of the insert member 1010 (i.e., also the bottom of the first reflux section 1030) forming a longer insert member 1010, where the two (or more) reflux sections 1030 are altogether installed into the inside bore 4020 of the passive shell 4010. In an embodiment, multiple additional reflux sections of the same or different sizes may be used.

Figure 4B:
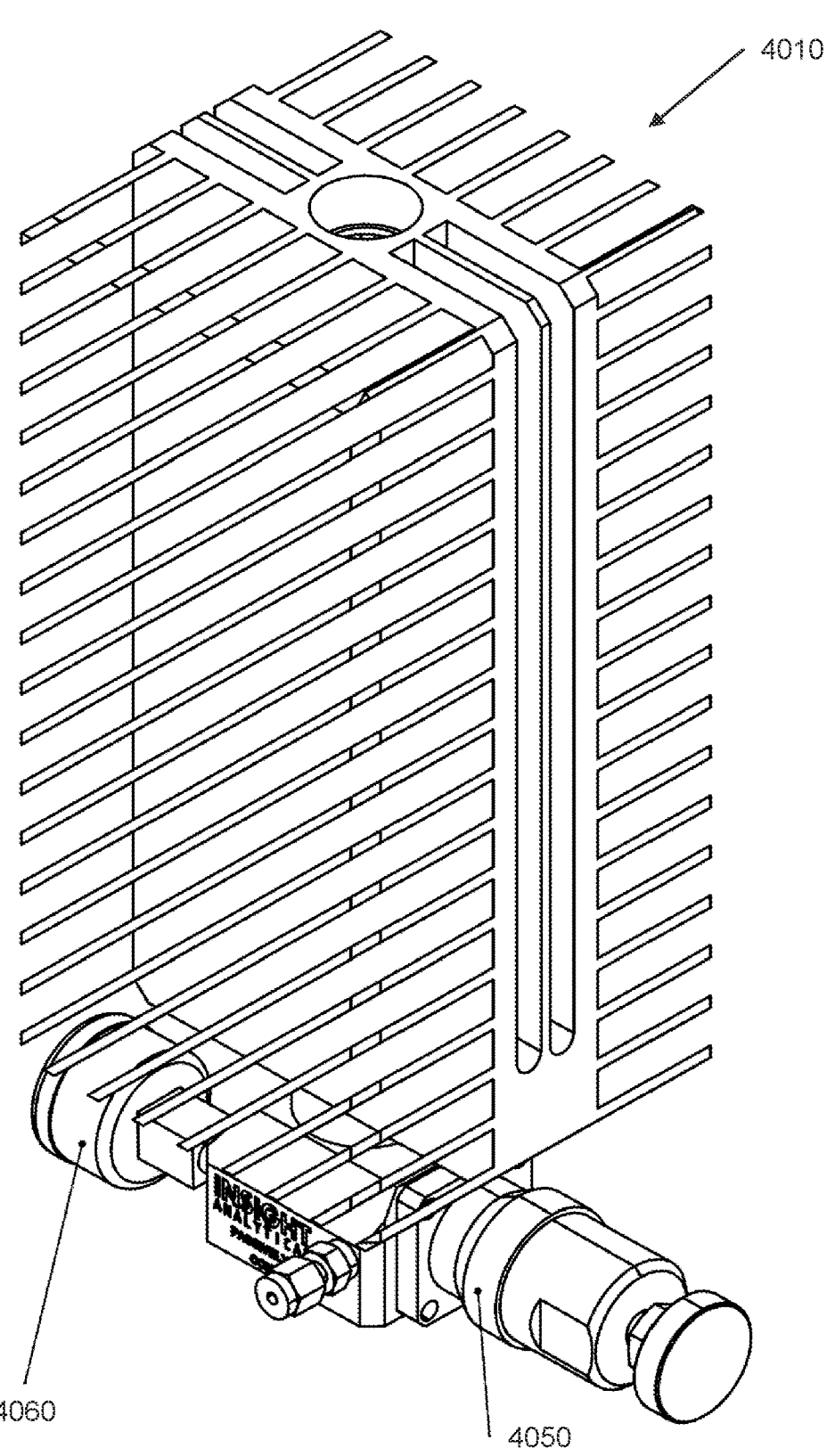
FIG. 4B illustrates another embodiment of a passive shell, in accordance with the present disclosure.

FIG. 4B illustrates another embodiment of a passive condenser assembly 4090 with a passive shell 4010, in accordance with the present disclosure. The passive shell 4010 may further include sample conditioning components with surface mounts that are compliant industry standards (e.g., an optional pressure regulator 4050 or an optional pressure gauge 4060) at the bottom of the passive shell 4010. The temperature at the bottom of the passive shell 4010 is normally much higher than that at the top of the condenser (e.g., the gas outlet 4030), so this arrangement allows the option of routing the sample (with a reduced dew point) that exits the top of the passive condenser (e.g., the gas outlet 4030) back down to the bottom of the passive condenser via external tubing to have its pressure regulated (with the pressure regulator 4050). Accordingly, the pressure regulator 4050 receives passive heating from the sample which is routed from exiting the top of the passive shell 4010 back to the bottom of the passive shell 4010 via the external tubing (not shown).

Figure 5A:
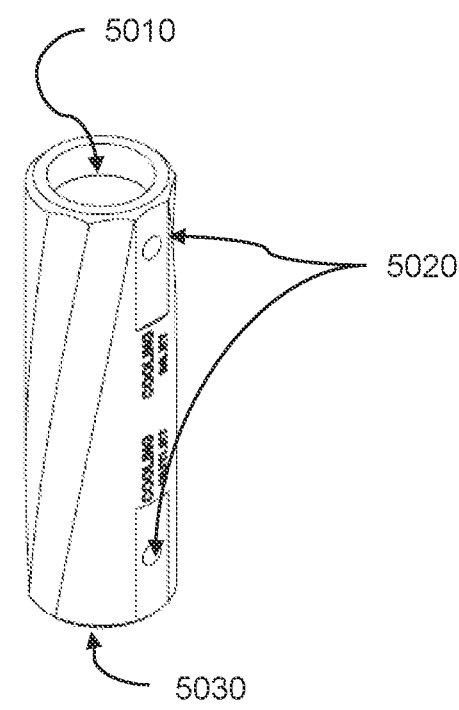
FIG. 5A illustrates an embodiment of a national pipe tapered (NPT) connector, in accordance with the present disclosure.
Figure 5B:
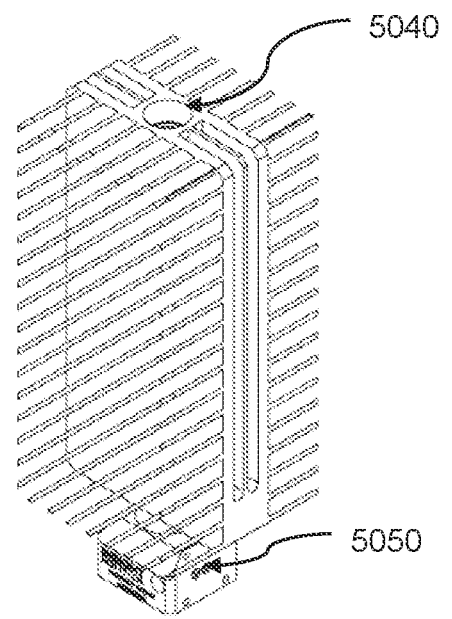
FIG. 5B illustrates another embodiment of a national pipe tapered (NPT) connector, in accordance with the present disclosure.

FIG. 5A illustrates an embodiment including locations for national pipe tapered (NPT) connections, in accordance with the present disclosure. FIG. 5B illustrates another embodiment including locations for national pipe tapered (NPT) connections. One or more threaded connector(s) or flange connector(s) may be used in the apparatus described herein. For example, an inlet or an outlet (referring to FIG. 5A and FIG. 5B) may use national pipe tapered (NPT) threads, making it possible to mount to either threaded or flanged process connections at locations indicated. The NPT thread can have a nominal size of ⅛ inch, ¾ inch, or 1 inch. In operation, a large 1 inch (1") NPT inlet connection 5030 allows the condensers to be mounted directly on top of existing sample probes with no additional support; a ¾ inch (¾") NPT outlet connection 5010 or 5040 makes it possible to mount heated filter housings or heated regulators on the outlet of the condenser. ⅛ inch (⅛") NPT connections 5020 may be used to allow to a cooling media to enter and exit the second shell 3010. Another 1 inch (1") NPT inlet connection 5050 may be used to connect an optional pressure regulator 4050 or pressure gauge 4060 to the passive condenser assembly 4090.

Figure 6A:
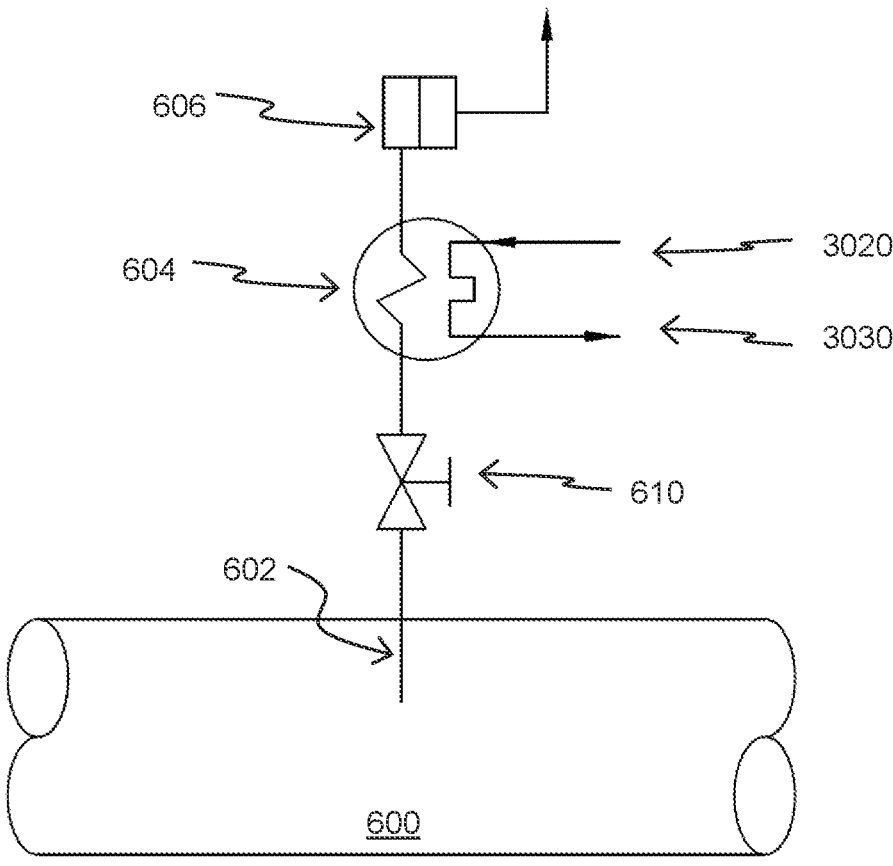
FIG. 6A illustrates an actively cooled condenser installation schematic, in accordance with the present disclosure.

FIG. 6A illustrates an embodiment including an actively cooled condenser installation schematic. A fluid flows through process 600 where it may be sampled by a sample probe 602. A valve 610 may be used to allow access of a fluid sample that is received by an actively cooled condenser 604 that may include an insert member 1010, a first shell 2010, and a second shell 3010. A cooling media may enter the actively cooled condenser 604 through a cooling fluid inlet 3020 and exit the active condenser 604 through a cooling fluid outlet 3030 to provide improved cooling of the condenser and more efficient condensation of the fluid. An optional filter 606 may also be provided before extracting the sample for analysis.

Figure 6B:
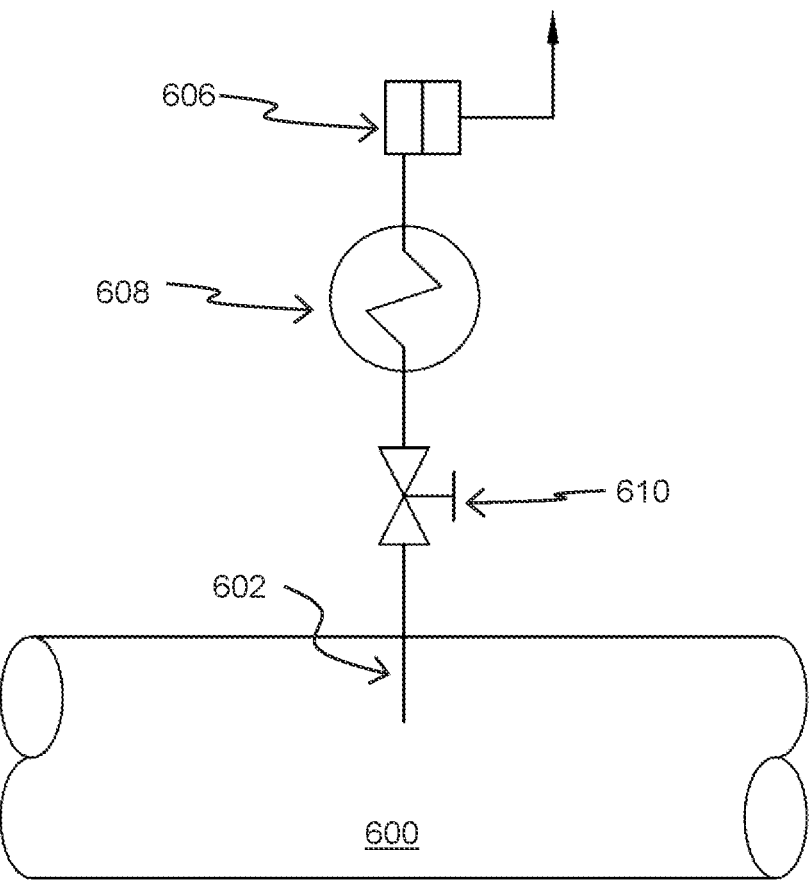
FIG. 6B illustrates a passively cooled condenser installation schematic, in accordance with the present disclosure.

FIG. 6B illustrates an embodiment including a passively cooled condenser installation schematic. A fluid flows through process 600 where it may be sampled by a sample probe 602. A valve 610 may be used to allow access of a fluid sample that is received by a passive condenser 608 that may include an insert member 1010 and a passive shell 4010. An optional pressure regulator 4050 or pressure gauge 4060 may also be used to control the sampling process. An optional filter 606 may also be provided before extracting the sample for analysis.

Embodiments of the active condenser assembly 2090 and the passive condenser assembly 4090 may employ different methods for cooling, but they also have advantageous design features in common such as compact size, light weight, easy mounting installation, selective materials, etc. For example, they are both compact in size, which allows installation at sample points where there is not much space available. Accordingly, their compact size (i.e., low internal volume) allows faster response time for a given flow rate than existing designs. Their compact size also makes them relatively easier for outdoor installation, and adaptive to cold environments that may cause freezing of condensed liquids.

Compared to existing reflux or distillation probe designs, embodiments of the present disclosure are relatively light weight (e.g., partly because of its compact size). Therefore, it becomes relatively easier to mount the condenser apparatus directly on standard sample probe designs (e.g., without requiring any extra support).

In accordance with the embodiments, the condenser's light weight is also due to a careful or deliberate choice of the design and/or construction materials. For example, stainless steel may be about three times denser than aluminum, therefore using aluminum extensively in the design or construction instead of stainless steel can significantly reduce the weight of the condenser apparatus. Notably, the thermal conductivity of aluminum may be about 10 to 15 times higher than that of stainless steel, thus the condenser apparatus using aluminum extensively is able to provide a high performance for heat exchange or transfer and cooling.

However, the active condenser assembly 2090 and the passive condenser assembly 4090 also have different features. For example, the finned body of the passive shell 4010 of a passive condenser assembly 4090 can be longer than that of the active condenser, because the passive condenser assembly 4090 (which relies on passive free convective heat transfer) has lower heat transfer rates.

Additionally, in an embodiment, although the finned body and insert member 1010 of a passive condenser assembly 4090 can be both made from aluminum (which is also the standard material used for the first shell 2010 and the insert member 1010 in the active condenser assembly 2090), other materials such 316 stainless steel may be used for the first shell 2010 and insert member 1010 when a higher maximum operating temperature is required. Notably, for material substitution, the same material should be used for the two (or more) parts that are joined by the "shrink fit" (e.g., the insert member 1010 and the first shell 2010 in the active condenser assembly 2090, or the insert member 1010 and the passive shell 4010 in the passive condenser assembly 4090). This arrangement substantially differentiates the design of the present disclosure from existing products because existing products either do not have any packing, such as with the saddle fins 1070, and have all of the cooling taking place on the inside cylindrical walls of a pipe, or have packing, such as random column or structured distillation packing, that doesn't have good contact with the cylindrical walls, such that the packing does not actually cool the sample but only increases the contact between gas and liquid condensate.

Embodiments of the present disclosure have packing that both encourages contact between liquid and condensate, but also cools the sample to create condensate. Because the insert member 1010 is not part of the pressure containment in embodiments, it is possible to coat the insert member 1010 with chemical vapor deposition coatings, which involves heating the materials (e.g., aluminum) to temperatures (e.g., above 300° C.) where the materials (e.g., aluminum alloys) may lose the strength needed for pressure containment. These coatings may make the inside surfaces of the condenser hydrophobic and/or oleophobic, which helps condensate drain better and improves heat transfer performance by reducing the liquid film thickness on cold surfaces.

To summarize, the embodiments of the present disclosure can provide various technical advantages. Embodiments provide a more compact and economical apparatus than existing commercially available probe-mounted condensers. In particular, they do not require massive electrical unities or complex control systems. Furthermore, their compact size and light weight can allow for direct mounting on probes with either flange or threaded connections. In addition, passive condenser assemblies cool the sample and reduces dew point to temperatures just over that of ambient conditions with no utilities required, while active condenser assemblies have thermally efficient designs that minimize the required cooling media flow rate and supply pressure.

The foregoing embodiments of the disclosure are examples and can be varied in many ways. Such present or future variations are not to be regarded as a departure from the spirit and scope of the disclosure, and all such modifications as would be obvious to one skilled in the art are intended to be included within the scope of the following claims.

As used herein, the term "about" or "approximately" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this disclosure belongs.

We claim:

1. An apparatus for cooling and condensing a fluid sample, the apparatus comprising:
   an elongated insert member having a condensing section in an upper portion, a reflux section in a lower portion, and a transition area between the condensing section and the reflux section,
   the condensing section including a plurality of angled helical fins defining a plurality of angled helical channels, the reflux section including a plurality of saddle fins, each of the saddle fins having an upper surface configured for self-draining of the fluid and a bottom surface, each of the saddle fins positioned to receive the sample from the plurality of angled helical fins, the condensing section and the reflux section operatively coupled along a central axis; and
   an elongated first shell having an inside bore and a plurality of multi-start helical fins formed on an exterior surface of the first shell, the plurality of multi-start helical fins defining a plurality of multi-start helical passages for a cooling medium to enter and flow in between the multi-start helical passages; wherein:
   the insert member is configured to be installed within the inside bore of the first shell so that the plurality of angled helical fins and the plurality of saddle fins make thermal contact with the inside bore to allow a heat transfer from the sample to the first shell.

2. The apparatus of claim 1 further comprising:
   a second shell having a cooling inlet and a cooling outlet, the second shell being secured to an exterior surface of the first shell at an end of the second shell with the other end of the second shell free to move axially and radially relative to the first shell, a space between the second shell and the first shell allowing the cooling medium to enter and flow in a counter-flow manner between the multi-start helical passages.

3. The apparatus of claim 2 wherein the cooling inlet is in an upper portion of the second shell and the cooling outlet is in a lower portion of the second shell.

4. The apparatus of claim 2 wherein the second shell is secured to the exterior surface of the first shell using a threaded connection.

5. A method of cooling and condensing a fluid sample, the method comprising:

receiving, by a sample probe, the fluid sample from a process flow;

passing the fluid sample through the apparatus of claim 2; and sending the fluid sample to an analyzer.

6. The method of claim 5, further comprising providing a cooling media to the apparatus.

7. The apparatus of claim 1 wherein the insert member further comprises a central bore formed from a top surface of the insert member and running along a central axis of the condensing section until an intersection with one or more radial bore formed in the transition area between the condensing section and the reflux section, the radial bore forming a passage between the central bore and the reflux section.

8. The apparatus of claim 1 wherein at least one of the plurality of saddle fins has a convex upper surface.

9. The apparatus of claim 1 wherein the plurality of saddle fins of the insert member is arranged in rows, each row offset by about 45 degrees from the row below.

10. The apparatus of claim 1 wherein the reflux section in the insert member is extendable in length.

11. The apparatus of claim 1, further comprising a second reflux section coupled to the bottom of the insert member forming a longer insert member with two reflux sections.

12. An apparatus for cooling and condensing a fluid sample, the apparatus comprising:

an elongated insert member having a condensing section in an upper portion, a reflux section in a lower portion, and a transition area between the condensing section and the reflux section, the condensing section including a plurality of angled helical fins defining a plurality of angled helical channels, the reflux section including a plurality of saddle fins, each of the saddle fins having an upper surface configured for self-draining of the fluid and a bottom surface, each of the saddle fins positioned to receive the sample from the plurality of angled helical fins, the condensing section and the reflux section operatively coupled along a central axis; and a passive shell having an inside bore and a plurality of cooling fins on an exterior surface of the passive shell; wherein:

the insert member is installed within the inside bore of the passive shell so that the plurality of angled helical fins and the plurality of saddle fins make thermal contact with the inside bore to allow a heat transfer from the sample to the passive shell.

13. The apparatus of claim 12 wherein the plurality of cooling fins are oriented diagonally.

14. The apparatus of claim 12, further comprising a gas outlet on the top of the inside bore of the passive shell.

15. The apparatus of claim 14 further comprising a filter housing mounted on the gas outlet.

16. The apparatus of claim 12 further comprising a pressure regulator or a pressure gauge at the bottom of the passive shell, wherein the pressure regulator receives passive heating from the sample which is routed from exiting the top of the passive shell back to the bottom of the passive shell via external tubing.

* * * * *